United States Patent
Roming et al.

(10) Patent No.: US 8,567,741 B2
(45) Date of Patent: Oct. 29, 2013

(54) HARD COATED SEAT RAIL

(75) Inventors: Thorsten Roming, Himmelpforten (DE); Gastao De Freitas, Hamburg (DE); Daniel Heydorn, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 89 days.

(21) Appl. No.: 12/872,266

(22) Filed: Aug. 31, 2010

(65) Prior Publication Data
US 2011/0049296 A1   Mar. 3, 2011

Related U.S. Application Data

(60) Provisional application No. 61/238,936, filed on Sep. 1, 2009.

(30) Foreign Application Priority Data

Sep. 1, 2009 (DE) .................... 10 2009 039 581

(51) Int. Cl.
*A47B 97/00* (2006.01)
(52) U.S. Cl.
USPC ........ 248/503.1; 248/500; 244/119; 410/115; 52/837
(58) Field of Classification Search
USPC ............... 248/424, 429, 430, 500; 410/115; 52/837, 309.16
See application file for complete search history.

(56) References Cited

U.S. PATENT DOCUMENTS

| | | | | |
|---|---|---|---|---|
| 4,158,613 A | * | 6/1979 | Sogo | 438/648 |
| RE31,339 E | * | 8/1983 | Dardi et al. | 428/678 |
| 5,055,356 A | * | 10/1991 | Minowa et al. | 428/409 |
| 5,749,165 A | * | 5/1998 | Schonborn et al. | 38/93 |
| 6,302,358 B1 | * | 10/2001 | Emsters et al. | 244/137.1 |
| 6,554,225 B1 | | 4/2003 | Anast et al. | |
| 7,100,885 B2 | * | 9/2006 | Zerner | 248/503.1 |
| 7,207,756 B2 | * | 4/2007 | Vichniakov et al. | 410/115 |
| 7,281,685 B2 | * | 10/2007 | Schoene | 244/118.6 |
| 8,093,531 B2 | * | 1/2012 | Kocik et al. | 219/121.64 |
| 2005/0156095 A1 | * | 7/2005 | Vichniakov et al. | 248/500 |
| 2006/0038071 A1 | * | 2/2006 | Schoene | 244/118.6 |

(Continued)

FOREIGN PATENT DOCUMENTS

| | | |
|---|---|---|
| DE | 42 24 821 A1 | 2/1994 |
| DE | 10 2004 026 228 B4 | 6/2007 |
| DE | 10 2008 018 542 A1 | 10/2009 |
| RU | 2 136 548 C1 | 9/1999 |

OTHER PUBLICATIONS

International Standard. "Specification for hard anodic oxidation coating on aluminium and its alloys," First Edition Sep. 1, 1994. Reference No. ISO 10074: 1994(E).

(Continued)

*Primary Examiner* — Anita M King
(74) *Attorney, Agent, or Firm* — Ingrassia Fisher & Lorenz P.C.

(57) ABSTRACT

A seat rail for attaching seats in aircraft is provided. The seat rail includes a profile element for attaching the seats, and a support element for attaching the seat rail in an aircraft. At least the support element is manufactured from aluminum or an aluminum alloy. The surface of the aluminum or the aluminum alloy includes, an oxide layer, and the oxide layer has been manufactured by means of hard anodic oxidation.

6 Claims, 5 Drawing Sheets

(56) References Cited

U.S. PATENT DOCUMENTS

| | | |
|---|---|---|
| 2006/0088725 A1 | 4/2006 | Ruggiero et al. |
| 2006/0283133 A1* | 12/2006 | Westre et al. ............... 52/729.1 |
| 2007/0080258 A1* | 4/2007 | Baatz et al. ............... 244/118.6 |
| 2008/0197234 A1* | 8/2008 | Wilhelm et al. ........... 244/118.6 |
| 2009/0130482 A1* | 5/2009 | Kocik et al. .................. 428/651 |
| 2009/0145886 A1* | 6/2009 | Kocik et al. ............. 219/121.35 |
| 2009/0321606 A1* | 12/2009 | Wilhelm et al. ............... 248/503 |
| 2010/0206989 A1* | 8/2010 | Roming et al. ............... 244/132 |
| 2011/0068226 A1* | 3/2011 | Baatz et al. ................ 244/118.6 |

OTHER PUBLICATIONS

German Office Action for German Application No. 10 2009 039 581.4-22 mailed Dec. 1, 2010.

* cited by examiner

HARD COATED SEAT RAIL

CROSS REFERENCE TO RELATED APPLICATIONS

This application claims priority to U.S. Provisional Patent Application No. 61/238,936 filed on Sep. 1, 2009 and claims priority to German Patent Application No. 10 2009 039 581.4 filed on Sep. 1, 2009, which are incorporated herein by reference in their entirety.

TECHNICAL FIELD

The present invention relates to a new type of seat rail for attaching seats in aircraft, in which the seat rail is characterised by good abrasion resistance.

BACKGROUND

Seat rails, in particular the profile elements of the seat rails to which the seats are attached, are subjected to considerable strain. Thus, seat rails are subjected to considerable mechanical loads as a result of passengers boarding and leaving the aircraft, and also as a result of the seat rails being installed and deinstalled.

Moreover, due to frequent installation of the seats, seat rails need to provide good abrasion resistance. However, a long service life of seat rails can be ensured only if there is no damage to the material. Exposure to humidity or to liquids, for example aggressive drinks (cola), in conjunction with the occurring mechanical loads results in quick ageing of conventional seat rails so that their safety is no longer ensured. Typically, this ageing process is caused by arising galvanic bridges between the individual components.

The aforesaid results in regular replacement of the seat rails, with the associated expenditure.

Accordingly, it is at least one object of the present invention to develop seat rails that endure considerable mechanical loads in the long term without there being any loss of stability. Furthermore, the seat rails are to be corrosion-resistant, relatively light in weight and economical so as to keep the overall weight of the aircraft as light as possible.

SUMMARY

The present invention is, in particular, based on the recognition that at least the support element of the seat rail needs to be made of aluminium or aluminium alloy that comprises a hard oxide layer.

Consequently, the present invention relates to a seat rail for attaching seats in aircraft, comprising a profile element for attaching the seats, and a support element for attaching the seat rails in an aircraft, in particular to the cabin floor of an aircraft, in which at least the support element (a) comprises aluminium or an aluminium alloy, and (b) the aluminium or aluminium alloy comprises a hard oxide layer at the surface.

The hard oxide layer is, in particular, an oxide layer that has been manufactured by means of hard anodic oxidation according to ISO 10074 (1994(E)).

BRIEF DESCRIPTION OF THE DRAWINGS

Further features, advantages and application options of the embodiments of present invention are disclosed in the following description of the exemplary embodiments and of the figures, where:

FIG. 1A is a detail view of the seat rail of FIG. 1;

DETAILED DESCRIPTION

The following detailed description of the invention is merely exemplary in nature and is not intended to limit the application and uses. Furthermore, there is no intention to be bound by any theory presented in the preceding background or summary or the following detailed description of the invention.

In the present invention the term "aircraft" refers to a device that flies in particular within the earth's atmosphere, i.e. up to a flight altitude of 150 km, in particular up to a flight altitude of 100 km. However, the seat rails described can also be used in space devices and other transport devices, such as trains and buses.

In particular, the aircraft is an aeroplane, helicopter or a dirigible airship or zeppelin. In a particular embodiment the seat rails are designed for use in aircraft, for example passenger aircraft.

Figure 1:
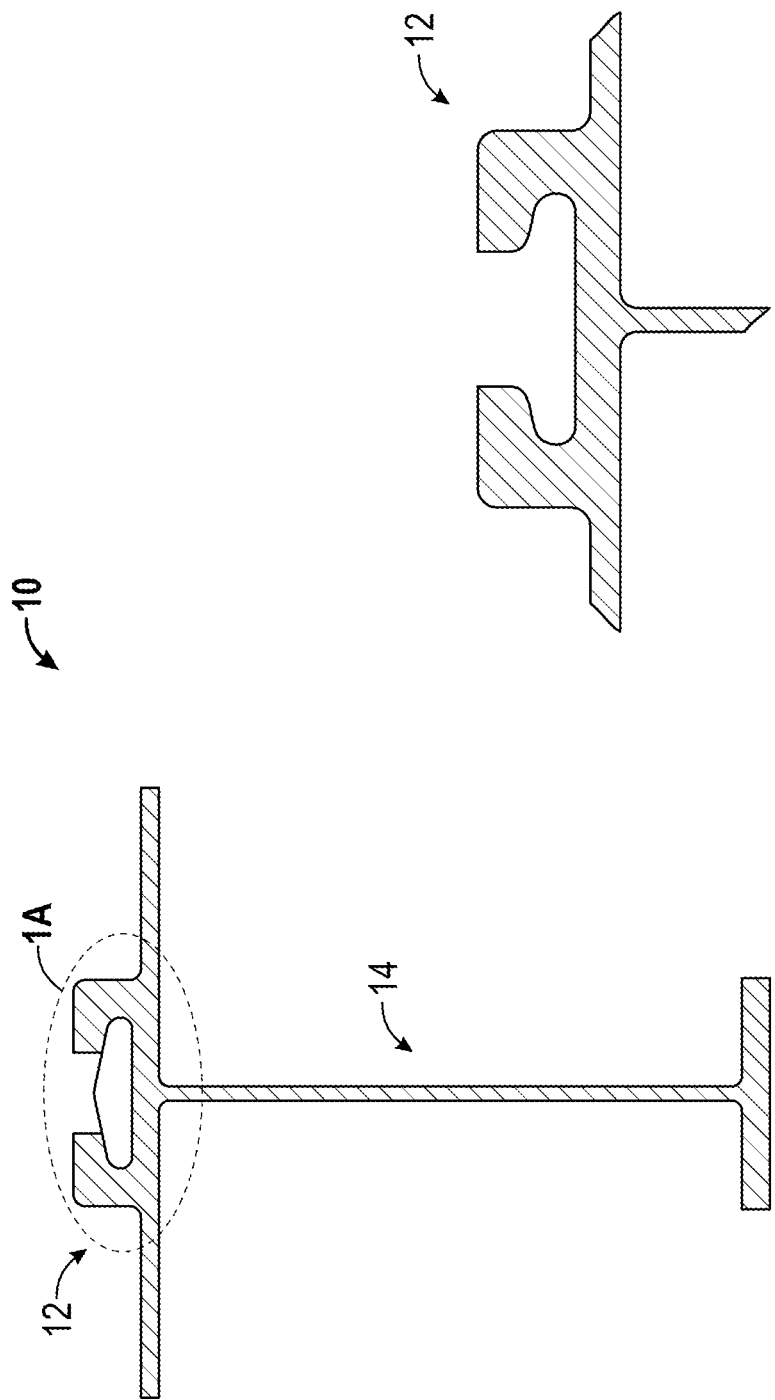
FIG. 1 is a seat rail according to an embodiment of the present invention comprises a profile element and a support element.

The seat rail 10 according to an embodiment of the present invention comprises a profile element 12 and a support element 14. The profile element 12 is designed in such a manner that seats can be attached to the seat rail 10, whereas the support 14 element is designed in such a manner that the seat rail 10 can be attached to the flying object, in particular to the cabin floor (FIG. 1).

As a rule, the profile rails used in (commercial) aircraft, which profile rails are used for attaching (passenger) seats, are standardised, for example by aviation standard LN 29 890. These profile rails share a common characteristic in that on a lower support element, preferably on a Ω-shaped or T-shaped lower support element 14, a profile element 12, preferably a C-rail-like profile element, is arranged. The profile element 12, in particular the C-rail-like profile element, preferably comprises an opening that points upwards, i.e. into the cabin, between two inward-projecting limbs that comprise holes and slits in alternating succession.

Corresponding attachment devices for detachably attaching (passenger) seats in an aircraft seat rail with a C-profile with the use of standardised seat rail dimensions are, inter alia, known from DE 42 24 821 A1. Furthermore, from RU 2 136 548 C1 a device for attaching passenger seats is known, in which device edge-shaped elements are provided for attaching the passenger seats in the seat rail. Finally, in U.S. Pat. No. 6,554,225 B1, too, an arrangement of seat rails in a lightweight floor structure in an aircraft is described, in which the option of arranging T-shaped seat rails in the floor of an aircraft is provided.

As far as the shape of the seat rail 10 is concerned, we refer in particular to these documents.

In the present invention the designations "aluminium" and "aluminium material" or "aluminium alloy" and "aluminium alloy material" refer to the same objects. Consequently, the profile element 12 and/or the support element 14 of the seat rail are manufactured from aluminium (aluminium material)

or an aluminium alloy (an aluminium alloy material). According to the present invention, the term "manufactured" denotes that the main component of the profile element 12 and/or of the support element 14 comprises aluminium (aluminium material) or an aluminium alloy (an aluminium alloy material). In a special embodiment the profile element 12 and/or the support element 14 comprise/comprises aluminium (aluminium material) or an aluminium alloy (an aluminium alloy material) to an extent of at least 90% by weight, preferably at least 95% by weight, or to (approximately) 100% by weight. If the profile element 12 and/or the support element 14 comprise/comprises aluminium (aluminium material) or an aluminium alloy (an aluminium alloy material) to an extent of less than 100% by weight, it comprises preferably in addition an additional cover, for example a polymer. This polymer, when present, is applied to the "aluminium material" or "aluminium alloy material" after production of the hard oxide layer.

In a special embodiment the profile element 12 and the support element 14 comprise one work piece. Consequently the profile element 12 and the support element 14 comprise an aluminium material or an aluminium alloy material according to the present invention.

At least one of the two elements has been manufactured from an aluminium (aluminium material) or an aluminium alloy (an aluminium alloy material) according to the present invention. Preferably, at least the profile element 12 comprises an aluminium (aluminium material) or an aluminium alloy (an aluminium alloy material) according to the present invention. In a further embodiment the profile element 12 and the support element 14 are manufactured from an aluminium (aluminium material) or an aluminium alloy (an aluminium alloy material) according to the present invention.

If the profile element 12 and the support element 14 of the seat rail 10 represent different components, it is preferable that they are interconnected by a homogeneous metallurgical connection. However, it is also imaginable for the profile element 12 and/or the support element 14 to comprise a profile in the connection region, and in this way a positive-locking connection between the two components is achieved.

The aluminium used, or the aluminium alloy used can be of any type, provided it has been hard anodised according to the present invention. Aluminium (alloys) of the group 1xxx, 2xxx and 7xxx, preferably 7xxx, according to EN 573-3/4, has/have been shown to be particularly favourable. In particular, this relates to an aluminium alloy selected from the group comprising $AlZnMgCu_{0.5-1.5}$, $AlZn_{10}Si_8Mg$, $AlCuMg_1$, AlCuMgPb, $AlMgCu_2$, $G-AlSi_9Cu_3$, $G-AlSi_6Cu_4$ and $G-AlCu_4Ti$.

Preferably, the thickness of the oxide layer is 2 to 200 µm.

Particularly preferably the oxide layer is a hard oxide layer, in particular an oxide layer manufactured by means of hard anodic oxidation, for example hard anodic oxidation according to ISO 10074 (1994(E)).

The oxide layer, i.e. in particular the hard oxide layer, for example the oxide layer that can be manufactured according to ISO 10074 (1994(E)), comprises preferably, i.e. at least, 90% by weight, γ-aluminium oxide. In a special embodiment the oxide layer is entirely comprised of γ-aluminium oxide.

The oxide layer comprises a further preferred feature in that at a nominal thickness of 50 µm+/−5 µm said oxide layer comprises at least a surface density, measured according to ISO 2106, of 940 mg/dm², preferably of at least 950 mg/dm².

As a result of the hard oxide layer the aluminium or the aluminium alloy is highly resistant to abrasion. Consequently, the aluminium or the aluminium alloy or the profile element 12 and/or the support element 14 is/are resistant to corrosion.

In a special embodiment the aluminium or the aluminium alloy are Hart-Coat® surface protection systems made by the company AHC Oberflächentechnik.

The present invention is not limited to seat rails in which at least the profile element or the support element is manufactured from hard oxidised aluminium or hard oxidised aluminium alloy, but instead also refers to the use of hard oxidised aluminium or hard oxidised aluminium alloy as a profile element and/or the support element of seat rails. In particular, the seat rails are seat rails that can be used in aircraft, for example passenger aircraft. As far as the preferred embodiments of the hard oxidised aluminium or the hard oxidised aluminium alloy are concerned, we refer to the above remarks.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

Below, the invention is described in more detail with reference to examples.

EXAMPLES

Test Object 1

Aluminium seat rail 7349/7055/7136 sulphur-anodised+adhesive primer coat+primer coat+topcoat Test Object 2

Aluminium seat rail 7349/7055/7136 with a HardCoat® (HC—Cu) protective system

Figure 2:
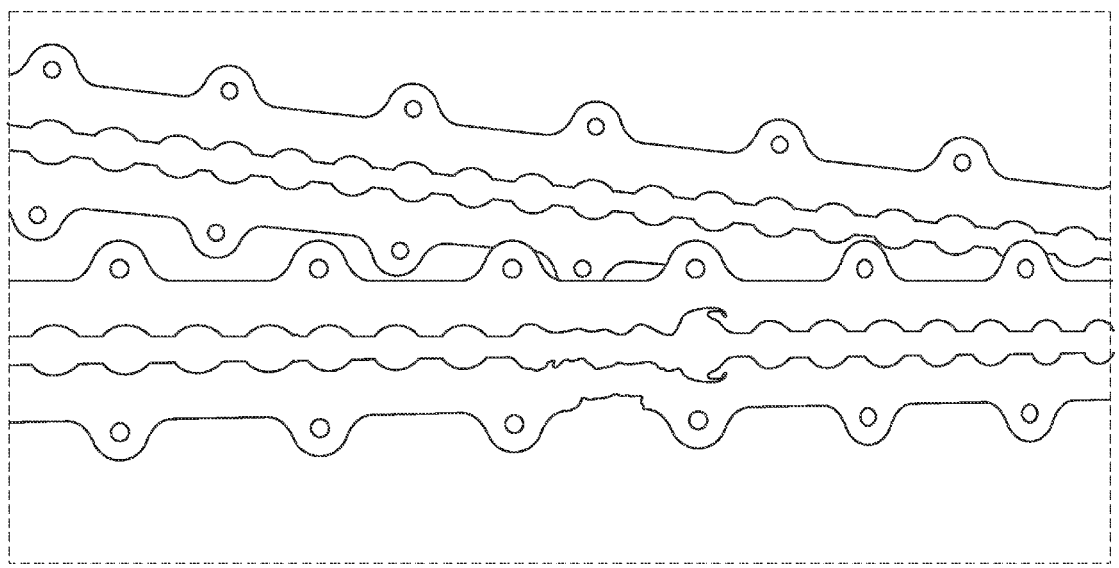
FIG. 2 and FIG. 3 show examples of damage as a result of vibration during flight operation on installed components such as the seat struts or floor panels or as a result of reconfiguring the cabin layout (rearranging seats)
Figure 3:
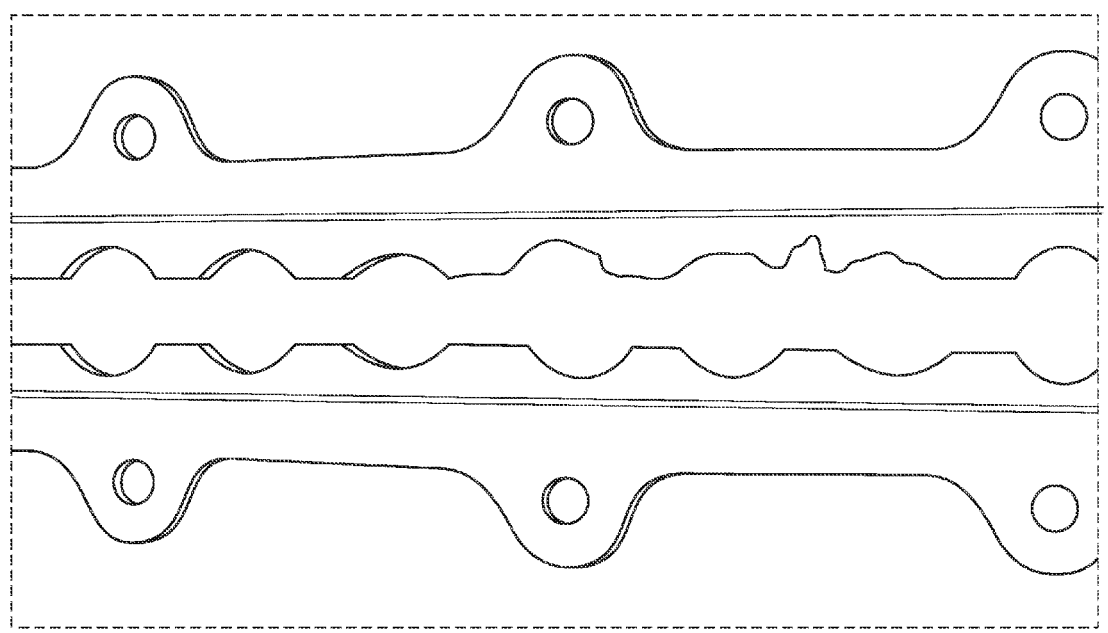

Corrosion-Resistant Seat Rail:

Seat rails, whether manufactured from titanium or from Al-alloys as today commonly used in Airbus aircraft, are subject to extreme requirements. In the case of aluminium rails, despite the provision of surface protection (on a paint basis) corrosion processes are inevitable. The interface partners, for example the floor panel comprising a CFRP sandwich structure, and the seat struts (unit receiving the seats) comprising cast steel, encourage galvanic corrosion. Above all if liquids, such as drinks, atmospheric humidity or special liquids from the toilet region find their way onto an already damaged surface-protected interface, accelerated corrosion processes are unavoidable. Damage to the surface protection of seat rails can have many reasons. During installation already, hardly visible paint damage can arise. As a result of vibration during flight operation on installed components such as the seat struts or floor panels or as a result of reconfiguring the cabin layout (rearranging seats), further paint damage arises (see FIG. 2 and FIG. 3).

Figure 4:
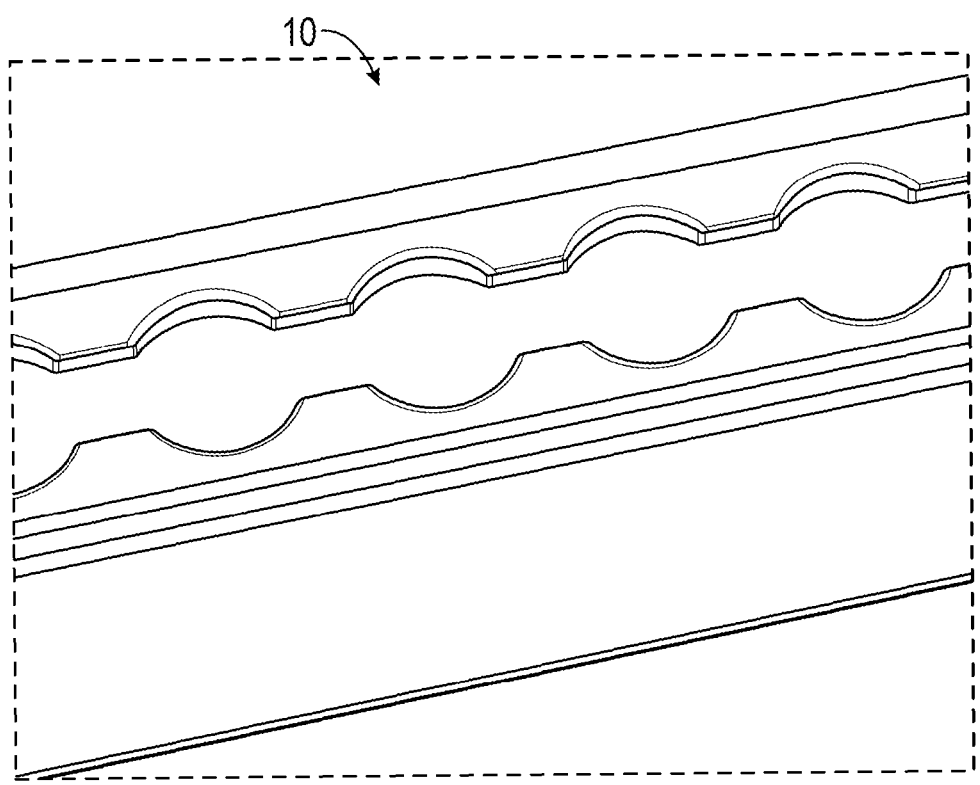
FIG. 4 and FIG. 5 show coated seat rails with very little sign of wear and tear when compared to that of standard seat rails based on painted protection after 20 cycles of installation and deinstallation.
Figure 5:
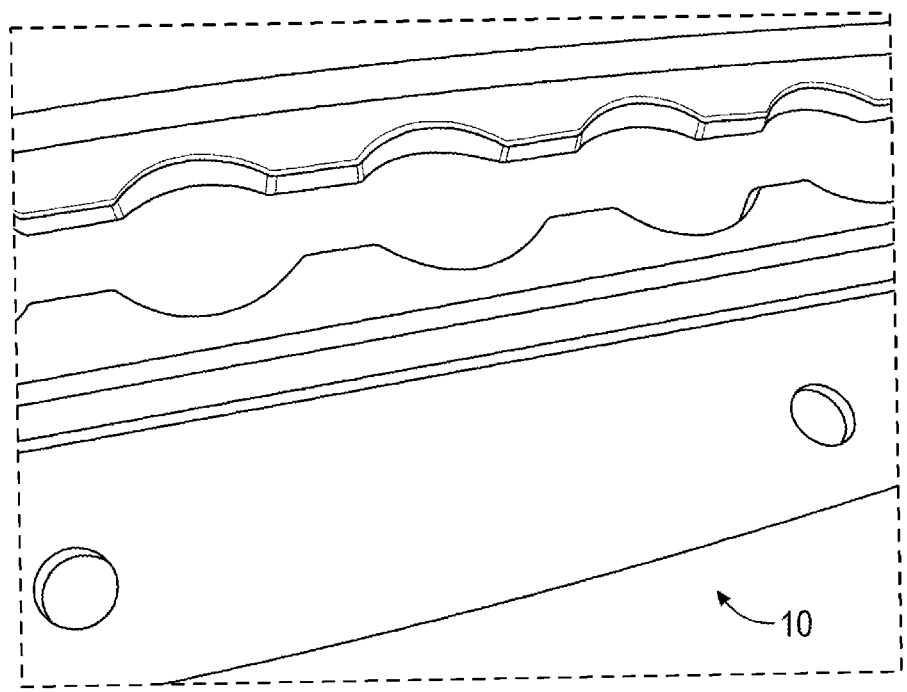

Approach:

Al-seat rails with a wear resistant surface comprising HardCoat®. In an installation experiment such coated seat rails showed very little sign of wear and tear when compared to that of standard seat rails based on painted protection. FIG. 4 and FIG. 5 show the results after 20 cycles of installation and deinstallation. The wear, i.e. the exposure of aluminium on the standard seat rail, was very much more pronounced, both at the top of the profile and above all on the running surface. In contrast to this, the HardCoat® seat rail had no visible damage on the running surface, and only some minor scratch marks at the profile top.

A subsequent experiment in a salt chamber, for a duration of 4 weeks, showed no visible corrosion in the case of the HardCoat® seat rail, and commencing corrosion processes in the standard rail.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A seat rail for attaching seats in an aircraft, comprising:
 a profile element for attaching the seats, the profile element manufactured from an aluminium or an aluminium alloy and defining an opening between two inward-projecting limbs, the opening including holes and slits arranged in an alternating pattern; and
 a support element for attaching the seat rail in the aircraft, with at least the support element being manufactured from the aluminium or the aluminium alloy,
 wherein a surface of the aluminium or the aluminium alloy of the support element comprises an oxide layer that has been manufactured by means of hard anodic oxidation according to ISO 10074 (1994(E)) and a polymer layer applied to the surface after the production of the oxide layer such that the polymer layer forms an outer layer of the support element.

2. The seat rail of claim 1, wherein the oxide layer of the aluminium or the aluminium alloy comprises at least 90% γ-aluminium oxide.

3. The seat rail of claim 1, wherein the oxide layer at a nominal thickness of 50 μm+/−5 μm comprises at least a surface density, measured according to ISO 2106, of 940 mg/dm$^2$.

4. The seat rail of claim 1, wherein the profile element and the support element are made from one piece.

5. The seat rail of claim 1, wherein a surface of the aluminium or the aluminium alloy of the profile element comprises an oxide layer that has been manufactured by means of hard anodic oxidation according to ISO 10074 (1994(E)) and a polymer layer applied to the surface after the production of the oxide layer such that the polymer layer forms an outer layer of the profile element.

6. The seat rail of claim 1, wherein the aluminium or the aluminium alloy is selected from the group consisting of aluminium 1XXX, 2XXX, 7349, 7055, 7136, AlZnMgCu$_{0.5-1.5}$, AlZn$_{10}$Si$_8$Mg, AlCuMgPb, AlMgCu$_2$, G-AlSi$_9$Cu$_3$, G-AlSi$_6$Cu$_4$ and G-AlCu$_4$Ti.

* * * * *